United States Patent [19]

Haruta et al.

[11] Patent Number: 4,496,629

[45] Date of Patent: Jan. 29, 1985

[54] MATERIAL USED TO BEAR WRITING OR PRINTING

[75] Inventors: Masahiro Haruta, Funabashi; Takashi Hamamoto, Yokohama, both of Japan

[73] Assignee: Canon Kabushiki Kaisha, Tokyo, Japan

[21] Appl. No.: 456,381

[22] Filed: Jan. 7, 1983

[30] Foreign Application Priority Data

Jan. 12, 1982 [JP] Japan .................................... 57-3004
Jan. 12, 1982 [JP] Japan .................................... 57-3005

[51] Int. Cl.3 ................................................ B32B 5/16

[52] U.S. Cl. .................................... 428/341; 428/207; 428/211; 428/323; 428/342; 428/409

[58] Field of Search ............... 428/195, 207, 211, 537, 428/511, 341, 342, 409, 323

[56] References Cited

U.S. PATENT DOCUMENTS 4,269,891 5/1981 Minagawa ........................... 428/211

OTHER PUBLICATIONS

IBM Technical Disclosure Bulletin, vol. 21, No. 6, Nov. 1978 by Crooks et al.

Japanese Abstract JA0051583, Apr. 1980 "Ink Jet Recording Paper."

*Primary Examiner*—Thomas J. Herbert

*Attorney, Agent, or Firm*—Fitzpatrick, Cella, Harper & Scinto

[57] ABSTRACT

A recording paper characterized by comprising a substrate coated with a layer finely divided by microcracks of irregular form into numerous lamellae. This paper quickly fixes the coloring matter of ink by capturing it with the lamellae and also quickly absorbs the solvent of ink through the micro-cracks into the substrate.

9 Claims, 6 Drawing Figures

50μm

50μm

50μm

50μm

50μm

MATERIAL USED TO BEAR WRITING OR PRINTING

BACKGROUND OF THE INVENTION

1. Field of the Invention

This invention relates to material on which a record of letters, figures, etc., is to be made by use of a recording liquid (hereinafter, the materials are referred to simply as recording materials).

2. Description of the Prior Art

Recording by use of a recording liquid or ink has long been made by means of writing tools such as pens, fountain pens, felt pens, etc. Recently, ink-jet recording systems have been developed, where ink is also utilized.

The ink-jet recording system makes a record by forming ink droplets with any of various ink-jetting processes (e.g. electrostatic attractive process, mechanical vibration or displacement process by use, of piezoelectric elements, bubbling process where bubbles are generated by an impulsive heating of ink, etc.), and leading parts or all of the droplets adhere to a recording material such as paper.

For recording in these ways and using liquid ink, ink is generally required not to blot on the recording paper so that the printed letters or figures may not become dim. The ink is also desired to dry as quickly as possible so as to prevent the recording paper from incidental staining with undried ink, and the coloring matter of ink fixed on the paper is desired not to fade out as long as possible.

In particular, the ink-jet recording system should satisfy the following requirements:

(1) Ink is quickly absorbed into recording paper.

(2) An ink dot, when overlapping a previously applied ink dot, does not become disordered or diffused particularly in multicolor or full-color recording.

(3) Ink dots do not diffuse on recording paper so as not to be enlarged more than needed.

(4) The shapes of ink dots are close to a right circle and the perimeters of ink dots have smooth lines.

(5) Ink dots have high optical density and distinct perimeter lines.

(6) Recording paper exhibits a high whiteness and a good contrast to ink dots.

(7) The color of ink does not vary depending upon recording paper used.

(8) Ink droplets scarcely scatter around the dots they form.

(9) Recording paper exhibits a minimum variation in dimensions due to elongation or wrinkles after recording.

While it has been known that satisfying these requirements is largely due to characteristics of the recording paper, in practice there has not been a plain paper or a specially finished paper, until now, that meets the above requirements. For example, the specially finished paper for ink-jet recording disclosed in Japanese Patent Kokai No. 74340/1977, though exhibiting a rapid absorption of ink, is liable to enlarge the diameters of ink dots and to make dim the perimeters of ink dots and exhibits a significant change in dimensions after recording.

SUMMARY OF THE INVENTION

The primary object of this invention is to solve the above problems, unsolved by the prior art, in the present technical field and, in particular, to provide a highperformance recording paper which fulfils almost all the above-mentioned requirements in the recording with liquid ink by means of writing tools or ink-jet recording systems.

According to the present invention, there is provided a material used to bear writing or printing, which comprises a substrate coated with a layer finely divided by micro-cracks of irregular form into numerous lamellae.

DETAILED DESCRIPTION OF PREFERRED EMBODIMENTS

Figure 1:
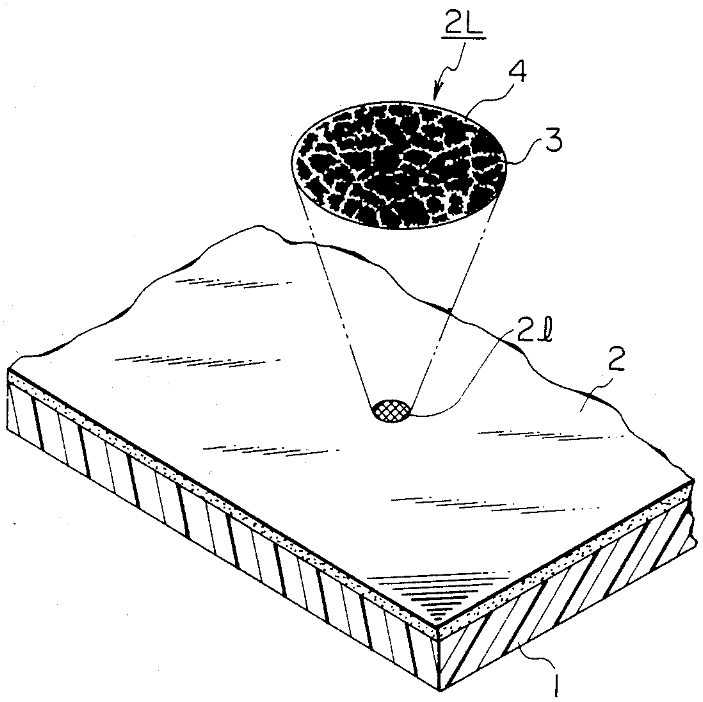
FIG. 1 is an illustration outlining the structure of the recording paper of this invention.

Referring to the drawings and the examples, this invention will be described below.

Initially, the construction of this invention is outlined with reference to FIG. 1.

In FIG. 1, numeral 1 is a substrate constituted of a porous material such as paper, cloth or the like, or a non-porous material such as glass, resin or the like. Porous materials are desirable for this substrate in view of their better ink-absorbing power, but it depends upon the use of the material on which writing or printing is effected. Numeral 2 is a coating layer, which acts chiefly as an ink-receiving layer.

The coating layer 2 is basically constituted of a coating material which comprises a film-formable resin and which may additionally contain one or more components selected from various surfactants and porous inorganic powders. These surfactants and porous inorganic powders can serve in the coating layer to enhance the efficiency of absorbing and capturing the coloring matter (e.g. dyestuff) of ink applied. In this invention, it is preferable to use positively these materials, of which especially effective ones are white inorganic pigments which are porous and have an ionic nature on the surface. Typical examples of such pigments are natural zeolites, synthetic zeolites (e.g. molecular sieves supplied by Union Carbide Corp.,), diatomaceous earth, fine powdery silica (average particle size of up to 1$\mu$), silica powder (average particle size of up to 20$\mu$), synthetic mica (generally represented by the formula $M.Mg_{2.5}(Si_4.O_{10}).F_2$ wherein M is hydrogen or metal atom), calcium carbonate, and the like. These pigments (generally several microns to several hundred microns in particle size) are dispersed singly or in a combination of two or more in a film-formable resin to prepare a coating material for the coating layer 2.

Either water-soluble resins or organic-solvent-soluble resins are usable for this purpose. The usable water-soluble resins include poly (vinyl alcohol), starch, casein, gum arabic, gelatin, polyacrylamide, carboxymethylcellulose, sodium polyacrylate, sodium alginate, and the like; the usable organic-solvent-soluble resins include poly (vinyl butyral), poly (vinyl chloride), poly (vinyl acetate), polyacrylonitrile, poly (methyl methacrylate), poly (vinyl formal), melamine resins, polyamides, phenolic resins, polyurethanes, alkyd resins, and the like. The compounding ratio of the resin to the inorganic pigment in the coating material ranges from 5:100 to 20:100 by weight.

The coating layer 2 can be formed by coating said substrate with said coating material in amounts generally of about 1–10 g/m$^2$, preferably about 2–5 g/m$^2$, in dry weight by known ways (e.g. roll coating, rod bar coating, spray coating, and air-knife coating). The coating material is then dried as soon as possible.

The coating layer 2 thus obtained comprises numerous fine lamellae 3, as shown in FIG. 1 as 2L, an about 50-fold magnitude view of a part 2l of the coating surface, said lamellae being separated from one another by micro-cracks 4 running at random (mostly so deep as to reach the substrate surface). The dimensions of each lamella 3 are not particularly limited but approximately from $10\mu\times 10\mu$ to hundreds $\mu\times$ hundreds $\mu$ in general. The width of each micro-crack 4 is also not particularly limited but generally several $\mu$. The dimensions or geometry of the lamellae 3, the widths of the micro-cracks 4, and the like can be varied at will within the above respective ranges by adjusting or controlling the composition of the coating material and film-forming conditions, particularly conditions of drying the coating material after application.

When ink is applied onto a given site of the coating layer 2 described above, the coloring matter of the ink (e.g., dyestuff) is selectively captured by adsorption and the like on the region of the lamellae 3 positioned at the given site, while the solvent of the ink passes through the micro-cracks 4 around these lamellae and is quickly absorbed into the substrate 1. Thus the coloring matter of ink, on recording, is mostly captured by the upper zone of recording paper, in this invention, so that excellent coloration of print is obtainable. On the other hand, the solvent of the ink quickly moves through the micro-cracks to the lower zone, i.e. the substrate, so that the ink on the paper surface is rapidly brought into a apparently dry state.

In addition, the lamellae 3 are particularly effective in preventing the ink dots applied from being enlarged more than is needed or from being dim at the perimeters, and in obtaining ink dots of high optical density. This is due to the intensive adsorption of the coloring matter of ink on the lamellae 3. The power of this adsorption depends upon the physical and chemical surface properties (for instance, ionic character) of the lamellae 3 themselves, the pigment particles, and/or the surfactant incorporated.

When the surface area occupied by the lamellae 3 on the recording paper face is excessively small, in other words, when the surface area occupied by the micro-cracks is extremely large, the efficiency of capturing the coloring matter is lowered, resulting in a poor coloration or low optical density of ink dots and the amount of ink migrating to the substrate increases giving rise to a so-called back penetration phenomenon of ink or the patterns of ink dots become inferior. Accordingly, embodiments of such a state of the coating layer should be avoided.

This invention will be illustrated in more detail by the following Examples:

EXAMPLE 1

A silica powder (100 parts by weight) and a poly (vinyl alcohol) (20 parts by weight) were dispersed and dissolved, respectively, in water and ground in a ball mill for 12 hours to form a slurry. The slurry was coated on one side each of 5 sheets of base paper (basis weight 60 g/m$^2$) so as to give a dry coating weight of 4 g/m$^2$.

These coated sheets were dried under the following different conditions to prepare samples I to V of recording paper.

Drying conditions:

Sample I . . . Natural drying by standing.
Sample II . . . In a 60° C. oven for two hours.
Sample III . . . In a stream of 90° C. air for 30 minutes.
Sample IV . . . In a stream of 110° C. air for one minute.
Sample V . . . In a stream of 180° C. air for two seconds.

Electron microscopic photographs of the sample bases (magnification factor 200) are shown in FIGS. 2–6.

Characteristics of the samples in ink-jet recording were compared and the results were summarized in Table 1. The optical densities of ink dots in Table 1 were determined by using a micro-densitometer (PDM - 5, mfd. by Konishiroku Photo. Ind. Co., Ltd.) with a $30\mu\times 30\mu$ slit at a sample speed of $10\mu$/sec in the X-axial direction and a chart speed of 1 mm/sec (speed ratio of sample to chart: 1/100). The diameters of ink dots were measured by use of a microscope.

The fixation time for ink is the time passed from the application of an ink droplet onto a sample paper until the ink does not adhere to the surface of a rubber press roll placed at a definite position apart from the ink-jetting head used in the forward direction of the sample movement; said time was measured by varying the sample speed, i.e., varying the time passed from the application of ink until the ink dot contacts with the rubber roll.

The diameter of ink-jetting orifice of the ink-jetting head used was $50\mu$. The ink used was of the following composition:

C.I. Direct Black 154: 3 parts by weight
Diethylene glycol: 30 parts by weight
Water: 67 parts by weight Ink properties Viscosity: 3.8 cps, as measured with a rotation viscometer (E-type, mfd. by Tokyo Keiki Co., Ltd.)
Surface tension: 52.4 dyne/cm, as measured by a plate suspension type of surface-tension meter (mfd. by Kyowa Kagaku Co., Ltd.)

TABLE 1

Figure 2:
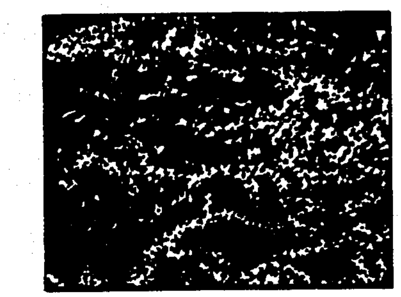
FIGS. 2–6 are traced copies of electron microscopic photographs of the present recording paper surface.
Figure 4:
Figure 3:
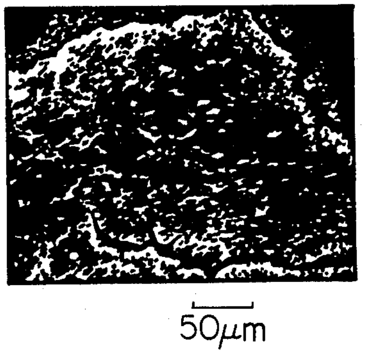
Figure 5:
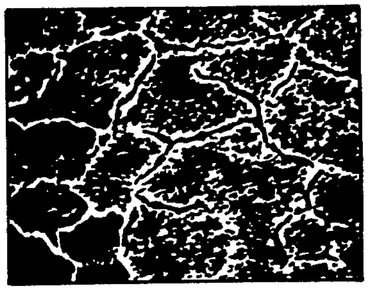
Figure 6:
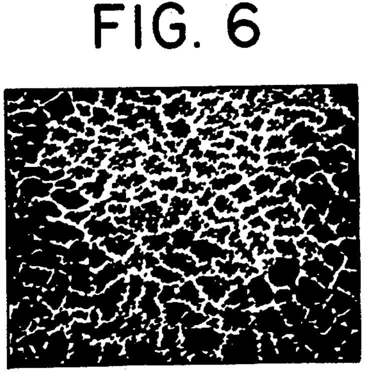

| | | Number of | Recording characteristics | | |
|---|---|---|---|---|---|
| sample No. | surface appearance | ink dots superposed (note 1) | Optical density of ink dot | Diameter of ink dot | Fixation Time |
| I | FIG. 2 | 1 | 0.85 | 150 (μm) | 1.1 (sec) |
| | | 2 | 0.93 | 160 (μm) | 1.6 (sec) |
| | | 3 | 1.01 | 200 (μm) | 3.0 (sec) |
| | | 4 | 1.24 | 260 (μm) | 6.4 (sec) |
| | | 5 | 1.30 | 310 (μm) | 10.2 (sec) |
| II | FIG. 3 | 1 | 0.88 | 130 (μm) | 1.0 (sec) |
| | | 2 | 0.96 | 162 (μm) | 1.5 (sec) |
| | | 3 | 1.10 | 195 (μm) | 2.8 (sec) |
| | | 4 | 1.20 | 220 (μm) | 5.0 (sec) |
| | | 5 | 1.31 | 270 (μm) | 8.4 (sec) |
| III | FIG. 4 | 1 | 0.92 | 100 (μm) | 0.6 (sec) |
| | | 2 | 1.10 | 115 (μm) | 0.9 (sec) |
| | | 3 | 1.21 | 124 (μm) | 1.7 (sec) |
| | | 4 | 1.33 | 135 (μm) | 2.3 (sec) |
| | | 5 | 1.39 | 150 (μm) | 3.2 (sec) |
| IV | FIG. 5 | 1 | 0.93 | 95 (μm) | 0.5 (sec) |
| | | 2 | 1.09 | 110 (μm) | 0.8 (sec) |
| | | 3 | 1.26 | 119 (μm) | 1.1 (sec) |
| | | 4 | 1.35 | 128 (μm) | 1.8 (sec) |
| | | 5 | 1.40 | 137 (μm) | 2.4 (sec) |
| V | FIG. 6 | 1 | 0.90 | 90 (μm) | 0.3 (sec) |
| | | 2 | 1.12 | 105 (μm) | 0.7 (sec) |
| | | 3 | 1.23 | 120 (μm) | 1.0 (sec) |
| | | 4 | 1.31 | 124 (μm) | 1.4 (sec) |

TABLE 1-continued

| sample No. | surface appearance | Number of ink dots superposed (note 1) | Recording characteristics: Optical density of ink dot | Diameter of ink dot | Fixation Time |
|---|---|---|---|---|---|
| | | 5 | 1.39 | 129 (μm) | 1.9 (sec) |

Note 1: Number of ink dots successively applied to the same point on the recording paper.

EXAMPLE 2

Diatomaceous earth (100 parts by weight) and sodium alginate (15 parts by weight) were dispersed and dissolved, respectively, in water and ground in a ball mill for 15 hours to form a slurry. The slurry was coated on one side of base paper (basis weight 65 g/m$^2$) so as to give a dry coating weight of 4 g/m$^2$, and was dried in a stream of 180° C. air for a few seconds to prepare a sample of recording paper.

The electron microscopic photograph of the resulting coating layer surface was nearly the same as shown in FIG. 6. The same ink-jet recording tests on this sample gave also nearly the same results as on the sample V in Example 1.

EXAMPLES 3 and 4

A sample identical with the sample V obtained in Example 1 was subjected to the same ink-jet recording tests as conducted in Example 1, by using inks of the compositions shown in Table 2. The results are also shown in Table 2.

TABLE 2

| Example No. | (Composition of ink (parts by weight) | Number of ink dots superposed | Recording characteristics: optical density of ink dot | Diameter of ink dot | Fixation time |
|---|---|---|---|---|---|
| 3 | C.I. Direct Black 19 (4) | 1 | 0.82 | 80 (μm) | 0.3 (sec) |
| | Ethylene | 2 | 1.03 | 90 (μm) | 0.6 (sec) |
| | glycol (70) | 3 | 1.21 | 98 (μm) | 1.0 (sec) |
| | Water (26) | 4 | 1.35 | 110 (μm) | 1.3 (sec) |
| | | 5 | 1.41 | 125 (μm) | 1.7 (sec) |
| 4 | Spilon Black GMH (4) | 1 | 0.85 | 85 (μm) | 0.2 (sec) |
| | Triethylene | 2 | 1.10 | 92 (μm) | 0.6 (sec) |
| | glycol | 3 | 1.23 | 110 (μm) | 0.9 (sec) |
| | monomethyl ether (40) | 4 | 1.29 | 128 (μm) | 1.2 (sec) |
| | Ethanol (56) | 5 | 1.38 | 140 (μm) | 1.6 (sec) |

The number of ink dots superposed and the evaluation criteria for the image quality in Table 2, are the same as in Table 1.

EXAMPLE 5

A sample identical with the sample V in Example 1 was subjected to full-color ink-jet recording test by using cyan, magenta, yellow, and black inks of the following respective compositions. The results showed nearly the same fixation time, optical density of ink dot, and diameter of ink dot as in Example 1. The printed colors were all very clear. Thus, full-color photographs with good color reproducibility could be duplicated.

Composition of yellow ink

C.I. Acid Yellow 23: 2 parts by weight
Diethylene glycol: 30 parts by weight
Water: 68 parts by weight Composition of magenta ink C.I. Acid Red 92: 2 parts by weight
Diethylene glycol: 30 parts by weight
Water: 68 parts by weight Composition of cyan ink C.I. Direct Blue 86: 2 parts by weight
Diethylene glycol: 30 parts by weight
Water: 68 parts by weight Composition of black ink C.I. Direct Black 154: 2 parts by weight
Diethylene glycol: 30 parts by weight
Water: 68 parts by weight

EXAMPLE 6

Specimens of the recording paper obtained in Example 2 were subjected to writing tests by use of a commercial fountain pen. The specimens quickly absorbed ink without being flurred with ink, resulting in very beautiful writing.

As illustrated above, the recording paper of this invention quickly absorbs the recording liquid (ink) applied thereto, and gives rise to no running or blotting of inks even when droplets of different colored inks are successively applied in short periods to the same point on the paper; the spread of ink dots on the paper can also be inhibited in such a degree as to keep the sharpness of image; thus this invention provides such excellent recording paper especially suited for multicolored ink-jet recording.

What we claim is:

1. A material suitable for printing with ink which material comprises a substrate and a coating layer thereon, said coating layer including a plurality of micro-cracks having the capability of passing liquid therethrough.

2. A material according to claim 1, wherein said coating layer is formed by coating said substrate with a coating material to give a dry coating weight of 1-10 g/m$^2$.

3. A material according to claim 1, wherein said coating layer is made of a resin coating material capable of film-forming.

4. A material according to claim 1, wherein said coating layer is made of a resin coating material capable of film-forming, said resin coating material includes a porous inorganic powder.

5. A material according to claim 1, wherein the width of each of said micro-cracks is several μ.

6. A material according to claim 1, wherein said coating layer is capable of absorbing coloring matter including dyestuff.

7. A material according to claim 1, wherein the coating layer is made of a resin coating material capable of film-forming, said resin coating material includes a porous inorganic powder and a surfactant.

8. A material according to claim 1, wherein said substrate is made of a porous material.

9. A material according to claim 1, wherein the coating layer is made of a resin coating material capable of film-forming, said resin coating material includes a surfactant.

* * * * *

UNITED STATES PATENT AND TRADEMARK OFFICE

CERTIFICATE OF CORRECTION

PATENT NO. : 4,496,629

DATED : January 29, 1985

INVENTOR(S) : MASAHIRO HARUTA, ET AL.

It is certified that error appears in the above-identified patent and that said Letters Patent is hereby corrected as shown below:

Column 1, line 19, change "use, of" to --use of--; and line 40, change "than needed." to --than is needed.--.

Column 3, line 7, change "magnitude" to --magnified--; and line 33, change "a" to --an--.

Column 5, line 36, change "(Composition" to --Composition--.

Column 6, line 36, change "ink which" to --ink, which--.

Signed and Sealed this

*Sixteenth* Day of *September 1986*

[SEAL]

*Attest:*

DONALD J. QUIGG

*Attesting Officer* *Commissioner of Patents and Trademarks*